Nov. 12, 1968
W. F. SAVAGE
3,410,133
METHOD OF AND STRUCTURE FOR TESTING THE
WELDABILITY OF HIGH STRENGTH STEELS
Filed June 27, 1966
2 Sheets-Sheet 1
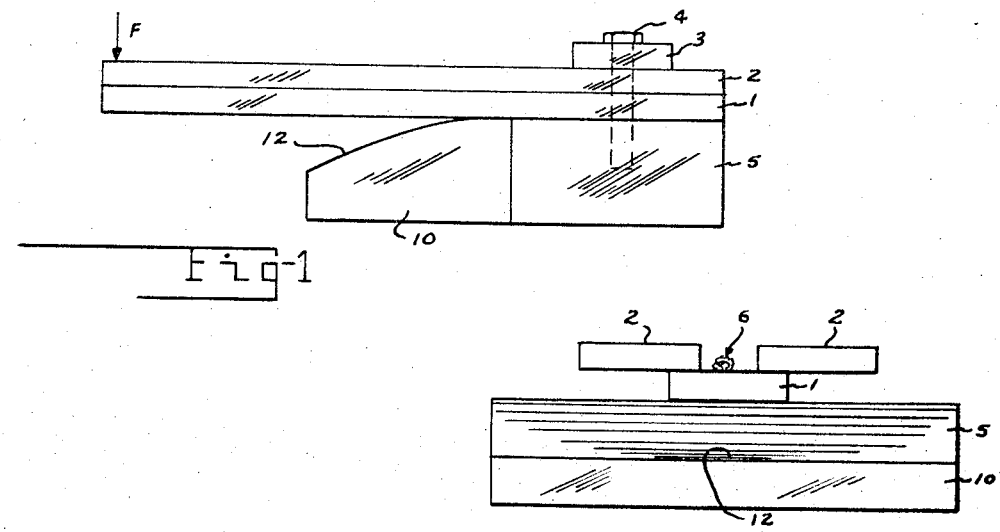
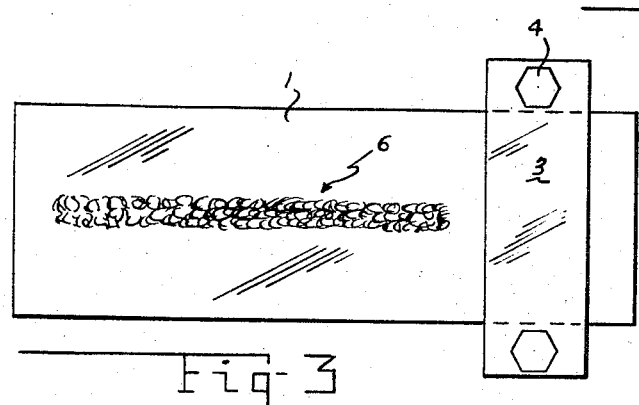
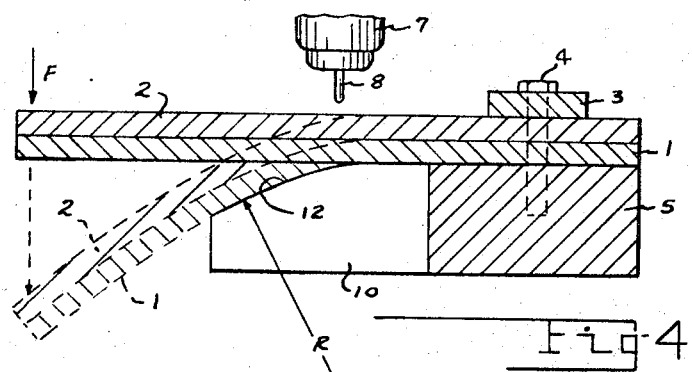
INVENTOR.
WARREN F. SAVAGE
BY Harry A. Herbert Jr
and
Herbert H. Brown
ATTORNEYS

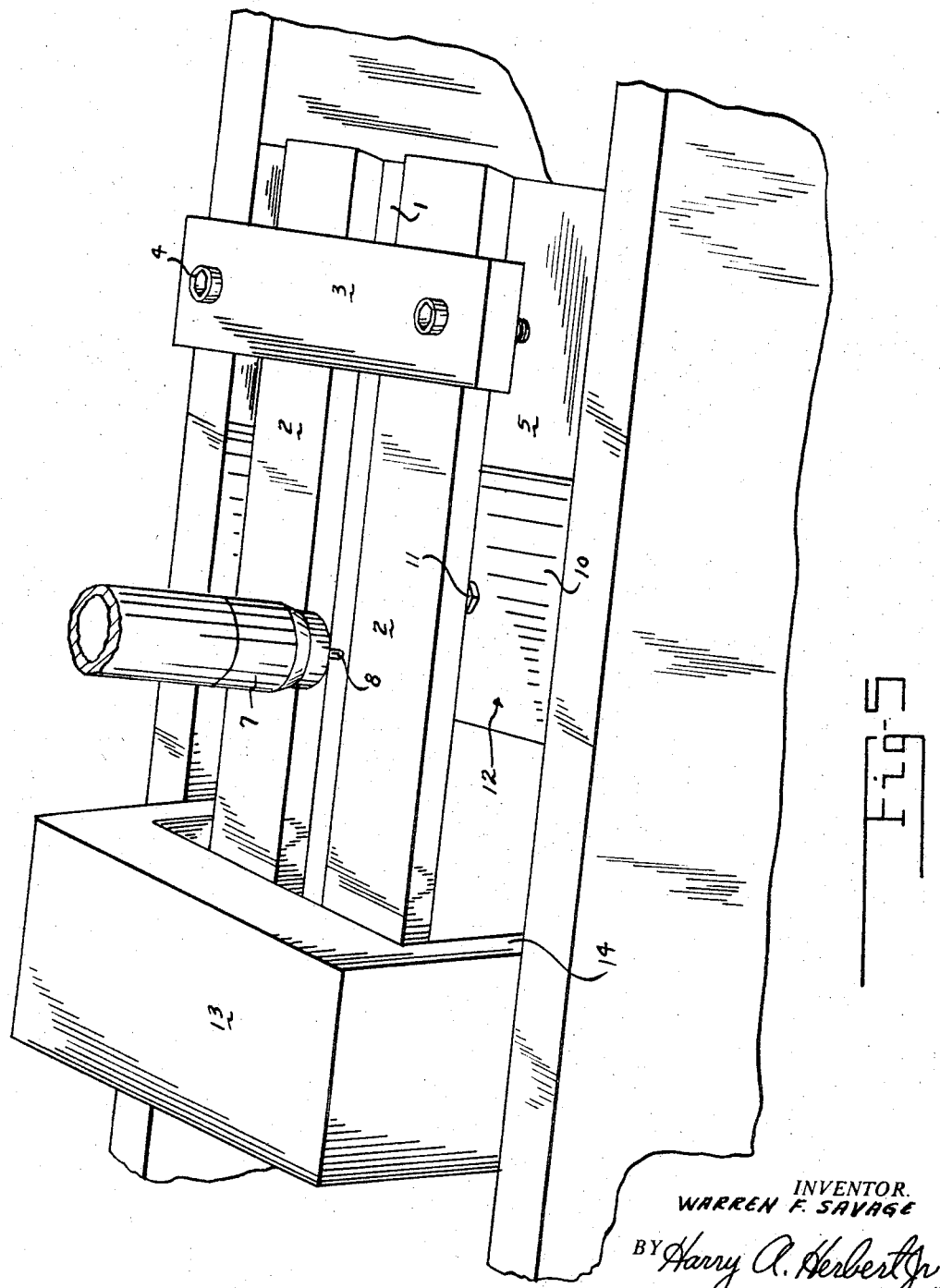

United States Patent Office 3,410,133
Patented Nov. 12, 1968

3,410,133
METHOD OF AND STRUCTURE FOR TESTING THE WELDABILITY OF HIGH STRENGH STEELS
Warren F. Savage, Averill Park, N.Y., assignor to the United States of America as represented by the Secretary of the Air Force
Filed June 27, 1966, Ser. No. 561,666
4 Claims. (Cl. 73—100)

ABSTRACT OF THE DISCLOSURE

The disclosure involves methods by which the presence of hot cracking when laying down a weld bead can be detected. The specimen, while hot from the absorption of heat from the weldment, is caused to bend about around a die block of predetermined curvature so as to put the member and the bead of weld metal under severe strain. Any tendency of the joined metals to produce cracks would immediately become apparent under such stresses as are designed to be much greater than those met with in service.

---

The present invention relates to improved tests and testing apparatus for determining the weldability of metal, constructional alloys and particularly high strength steels used for thin walled rocket motor cases of welded construction and for other purposes.

Many existing and proposed weapons and associated equipment could not be made except by welding and yet, in many instances, welding may introduce defects such as inclusions, voids or cracks, both large and small.

While the large cracks in the welded joints can usually be detected during the welding operation, the small cracks or fissures may go undetected until the steel member is subjected to high stress in service at which time the presence of the defect may lead to a costly joint failure. These minute cracks, or so-called hot cracking, are usually found in the deposited metal forming the weld and may be due to various causes, such as the character of the welding rod, perhaps certain irregularities in the welding technique or peculiarities of the metal on which the weld is being deposited.

The present invention relates mainly to the detection of cracks, actual or potential, formed during welding and from whatever cause, not only in the weld deposit but also in the metal pieces that are being spanned by the weld material.

A review of the literature on joining metals in general, and more specifically high strength steels indicates that the major problems are largely metallurgical in origin, more especially the metallurgical characteristics of the various types of high performance steels, their relatively high alloy content and the present limited metallurgical background knowledge, all of which present complex problems in the welding metallurgy.

I have found that the formation of the weld is sensitive to many influences. Even the macroscopic shape of the weld puddle may bring about hot cracking, a long teardrop shaped puddle being more susceptible in this respect than the elliptically shaped weld puddle. Regardless of the cause, it is of paramount importance to discover these cracks and even the tendency to crack while the weld is being deposited as the propensity to crack may lead later to the appearance of actual fissures and eventual failure under high stress conditions.

Various proposals have heretofore been made to determine the presence of hot cracking but none to my knowledge have been entirely successful. For example, an earlier concept involved pulling a long, narrow curved specimen through a set of straightening dies so located with respect to the welding arc that the straightening strains would be imposed during or immediately following solidification of the weld metal. While this concept may be suitable for testing of thin sheet specimens, the design of the straightening dies, die life and the force required to pull the specimen through the dies represent serious problems with metal of considerable thickness, i.e., ¼" and above.

An ideal test for determining the presence of cracking should incorporate the following features:

(1) Ability to show a direct correlation with actual fabrication and service behavior.
(2) Reproducibility of results with freedom from variation due to the human element.
(3) Sensitivity to small changes in the variations of the test.
(4) Ability to show the effects of variations in the welding techniques.
(5) Economical preparation of the test specimens and running of the test.
(6) Applicability to all welding processes.

An object of the present invention is to provide a cracking test which appears to embody all of these six features.

Another object is to provide an improved method by which the presence of even small cracks, potential or actual, can be detected, either in the weld deposit or within the heat-affected zone of the joined metal.

Still another object is to provide an improved testing technique and device for detecting the presence of hot cracking when laying down a weld bead and which will produce a constant reproducible strain of magnitude essentially independent of the welding parameters and applied simultaneously over a finite length of weld.

These objects are attained, in brief by laying down, according to standard procedure, a bead of weld metal on the surface of a strip of the selected high strength steel and while the bead is still hot i.e. in a near-fluid state and has just started to harden, subjecting the strip to a suddenly applied force to bend the strip around a die block of predetermined curvature to set up severe stresses in the specimen. Thus, an augmented strain is suddenly applied to the actual welded composite at temperatures from the melting point to far below the hot cracking range. Any tendency of the joined metals to produce cracks would immediately become apparent under such stresses as are designed to be much greater than those met with in service.

The invention will be better understood when reference is made to the following description and the accompanying drawings in which:

FIG. 1 represents, as a diagram, the side view of an improved structure for evaluating on a qualitative basis the efficacy of a welded joint;

FIG. 2 shows an end view, also in diagram, of part of the test structure with the specimen in place;

FIG. 3 and FIG. 4 are simplified sketches useful in explaining the principles of the invention. FIG. 3 represents a plan view, while FIG. 4 is shown in section for clearness; and FIG. 5 is a sketch taken from a photograph depicting the actual machine employed for making the weld determinations and evaluations.

Referring to FIGS. 1 and 2, reference character 1 designates a specimen which may be constituted of a quenched-and-tempered high-yield-strength steel or maraging steel, or any other structural alloy of interest. For the purpose of the test, the strip or specimen may be about 2" wide and possibly 12" long. The thickness would be about ¼" or even thicker, if desired, this dimension being determined by the contemplated thickness of the missile or rocket casing. Along the side edge portions of the specimen and overlapping about ⅜", there is a pair of strips or bars 2, also about 2" wide made of cold rolled bar stock and extending the same length as the specimen. The latter and the said strips are held in horizontal parallel alignment by means of a heavy cross-wise strap 3 which is bolted at 4 to a solid metal base member 5. A space of about 1" is left between the two inner edges of the bars 2. Within the space, there is a bead of welding material, indicated at 6, laid down according to standard practice, preferably using a longitudinally moving welding head 7 in FIG. 4, which travels from left to right at a uniform predetermined speed. The head is provided with a welding rod 8 of a type suited to the metal of the specimen or a tungsten electrode. The puddle of the weld, as indicated at 6 in FIG. 3, is moved steadily along the specimen, one glob overlapping the other in a uniform manner, so as to yield reproducible results. All grease or other contamination is removed from the specimen before the welding bead is laid down.

Abutting the base member 5 there is a removable die block 10, temporarily held in rigid position by bolts 11 (FIG. 5), the upper surface of which is curved as indicated at 12. This curvature is predetermined, as explained hereinafter, and its purpose is to subject the specimen and the weld bead to a predetermined longitudinal strain by a sudden bending operation.

As the welding arc passes from left to right and while the weldment is still near the fluid state, a force F is suddenly applied to the ends of the bars 2 (FIG. 2), opposite from the strap 3 at the time the welding rod 8 will have reached at about the horizontal tangential point of the curved surface 12. The specimen 1 tends to bend at the location where the heat of the welding arc has reduced the strength of the material to a minimum and the effect of the bars 2 is to force the specimen to conform to the contour 12 of the die block as indicated in FIG. 4. It can be readily seen that a bend lengthwise is introduced into the specimen and its weld bead. This produces an augmented longitudinal strain which places a trendous stress on the outer fibers of the specimen including the weld bead, the heat-affected zone, also the unaffected portion of the specimen. I have shown the curve of the die block as conforming to the radius R (FIG. 4) of a circle. The magnitude of the strain can be calculated from the specimen geometry and the circular radius of the die block.

The equation for the approximate longitudinal strain is:

$$E_L \cong \frac{t/2}{R} = \frac{t}{2R}$$

where $t$ = specimen thickness
$R$ = radius of curvature of the die block
$E_L$ = longitudinal strain.

The amount of augmented strain can be varied simply by substituting a die block of different curvature.

For accurate results, it may be desirable to enclose the entire test apparatus in an inert atmosphere chamber by simply sealing the unit and purging with argon gas for a sufficient length of time to ensure at least 15 completed volume changes per test. The chamber is then maintained at a slight positive pressure by controlling the purge-gas flow rate and the leak rate of the chamber. The use of the inert gas is desirable only to prevent oxidation of the welded surface during testing and is not intended to enhance the weldability of the material in any manner.

Since the force F can be made to introduce a terrific strain, not only in the weld bead but also within the specimen itself, any actual cracking or tendency to crack, either within the bead or within the specimen or both, is bound to appear, generally in an exaggerated form. Since the magnitude of the augmented longitudinal strain is independent of the welding parameters, also of the effect of the welding process and weld composition, as well as other parameters influencing the microstructural features of the weldment, the metallurgical factors contributory to hot-cracking are therefore in effect isolated from the mechanical effect of the externally imposed restraint. Thus the weld puddle, together with a continuous length of the weld bead and the heat-affected zone are subjected to a reproducible augmented strain in the presence of the temperature distribution characteristic of the particular welding procedure employed.

In FIG. 5 there is shown a close-up view of the testing device with the specimen, the contoured die block, and the loading yoke 13 for applying the force F in place. The loading yoke may be constituted of a heavy bar support at its ends by two bar uprights. The yoke is positioned directly over the ends of the bars 2, and in the position shown, the yoke 13 has not as yet applied any downward force on the bars. The lower ends of the uprights 14 are joined together for conveniently receiving a downward pull by means of a cylinder-piston device (not shown) which operates through the use of compressed air of sufficient pressure to provide the bending force for the specimen. Such apparatus is well known in the art. The application of the compressed air to the cylinder is effected through valves (not shown) which may be under the control of an electrical circuit of suitable and well known character which preferably provides a time relationship with respect to the movement of the welding head 7.

The piston-cylinder apparatus therefore exerts a downward force F from the approximate position shown in FIG. 4 and remains effective until the requisite length of the specimen 1 and superposed bars 2 closely conform to the entire length of the curvature of the die block as the arc travels steadily onward.

The specimen is then taken out of its holding supports and closely examined, both as to the weld material and the heat-affected zone for flaws and cracks which might have been introduced by the augmented strain. Microphotographs may also be taken for closer study. No material has been found in which hot cracking cannot be induced by a suitable choice of the augmented strain, i.e., by proper selection of the force F and the radius of the curved die block. This is perhaps one of the major advantages of the procedures since it permits assigning even a relatively crack-insensitive material to its proper position on the crack sensitivity scale. It will be further noted that the test procedure lends iself to metal of considerable thickness.

The crack length in the weld bead and the immediately adjacent surface should be measured since they are proportional to the width of the cracking temperature range for a given welding procedure and a particular level of augmented strain. The maximum crack length has been found to provide a useful qualitative index of cracking sensitivity. Measurements of total combined crack length can also provide a useful qualitative index of cracking sensitivity and the total combined crack length of values may be employed for comparing the effect of changes in welding procedure with a given material.

While a specific embodiment has been described, it is obvious that numerous changes may be made without departing from the general principle and scope of the invention.

I claim:

1. In the method of determining the propensity of a hot welded bead to crack when applied to a specimen of steel, the step of laying down a hot bead of weld metal and while in a near fluid state, applying a force at the end of the specimen to cause the specimen to bend around a surface of predetermined curvature whereby the appearance of cracks in the curved specimen and bead becomes a measure of the tendency of the welded joint to crack during fabrication by welding and therefore be likely to fail in service.

2. A method according to claim 1 in which the said curvature and force applied are so predetermined as to subject the specimen and weld to a greater strain by a more rapid rate of change in shape than would be present during fabrication by welding.

3. In the method of determining the propensity of a hot welded bead to crack when applied to a metal specimen, the steps of laying down a portion of the full length of a weld bead on the specimen, and while still hot, applying a force to one end of the specimen, and simultaneously bending the specimen about a curved surface while continuing to lay the remainder of the weld bead along the specimen whereby the cracking of the hot weld metal along any part of its length would indicate a tendency of the weld to crack during actual welding fabrication.

4. In the method of determining the tendency of a hot welded bead to crack when applied to a metal specimen, the steps of holding one end of the specimen rigidly against the top surface of a curved die block to allow the opposite end of the specimen to hang over the block, said block having a surface which is curved downwardly at a predetermined rate from the position of the overhanging portion of the specimen, then applying a weld bead along the specimen, beginning with the farthest end of the overhanging portion, and working toward the top flat surface of the die block, then suddenly applying a downward force at said farthest end when the position of the bead will have reached the uppermost flat surface of the die block, of sufficient amount to cause the overhanging portion of the specimen and the deposited bead to bend downwardly and conform closely to the curved surface of the die block while continuing to deposit the bead along that length of the specimen which remains on the top flat surface of the die block, said force being removed immediately after the overhanging portion has completely conformed to the curved surface of the die block whereby cracks are caused to form in the bead in the event that the weld would have cracked during welding fabrication and therefore have been likely to fail under service conditions.

References Cited

UNITED STATES PATENTS

| 2,528,918 | 11/1950 | Stanius | 73—100 |
| 2,732,712 | 1/1956 | Reed | 73—100 |
| 2,831,344 | 4/1958 | Kaar et al. | 73—100 |

FOREIGN PATENTS 920,942  10/1954  Germany.

RICHARD C. QUEISSER, *Primary Examiner.*

J. H. WILLIAMSON, *Assistant Examiner.*